Dec. 11, 1945.  H. W. CRAM  2,390,514
WIRE COIL INSERT
Filed June 1, 1944

INVENTOR.
HARKNESS W. CRAM
BY Walter S. Bleston
ATTORNEY

Patented Dec. 11, 1945

2,390,514

UNITED STATES PATENT OFFICE 2,390,514

WIRE COIL INSERT

Harkness W. Cram, Mount Vernon, N. Y., assignor to Aircraft Screw Products Company, Inc., Long Island City, N. Y., a corporation of New York Application June 1, 1944, Serial No. 538,215

6 Claims. (Cl. 85—32)

The invention relates to a wire coil lining of the thread of a hole tapped in a boss or nut member. Such linings are frequently used in order to provide a threading which is better resistant to wear than the soft material of a boss of, e. g. aluminum or magnesium or their alloys. In connection with such inserts, it is the intention that an externally threaded member, such as e. g., a bolt, stud, or spark plug, may be repeatedly screwed in or out of the inner portions of the coil convolutions while the outer portions of the latter when once inserted stay in engagement with the tapped threading. However, it frequently happens in such connnections when a bolt previously screwed into the coil is backed out, that the coil is taken along by the bolt and also screwed out of the boss member. The invention contemplates the provision of a coil which can be so anchored in a tapped boss or nut member that it cannot or at least not readily be backed out of its position. The invention consists in that a portion of one or of each each of the end convolutions is recessed on its outside so as to form teeth which may be forced radially into the material surrounding the thread groove of the boss member. Thereby it will be obtained that the coil end or ends is or are securely anchored so as to offer a very considerable resistance to a movement of the coil relatively to the boss member; simultaneously an additional advantage will be attained in that the pressure applied to a coil end in order to force the teeth into the boss material will widen that end to an inner diameter larger than that of the coil body. In consequence, a stud to be screwed into the coil will enter the first convolution more readily than it would if the coil end had the same diameter as the remainder, i. e. a diameter which is more or less accurately fitting that of the stud. The invention also consists in an element such as a boss or nut member, provided with a tapped hole and wire coil lining of the tapped threading wherein at least one of the coil ends is provided with teeth embedded in the material of the element to a depth equal to the difference in the inner diameters of such coil end and of the remainder of the coil. Further details and objects of the invention will be apparent from the accompanying drawing illustrating an embodiment of the invention by way of example. In the drawing, Fig. 1 is a side elevation of a coil according to the invention;

Figure 4:
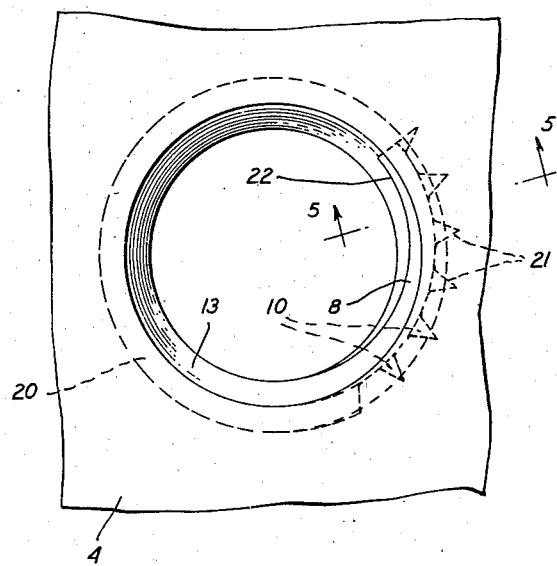
Fig. 4 is a top view on a larger scale of the coil inserted in the tapped hole of a boss member.
Figure 5:
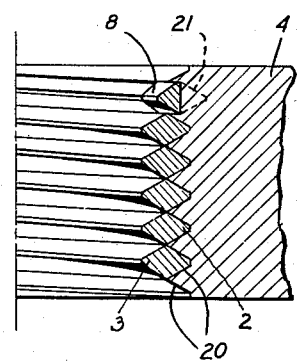
Fig. 5 is a section along line 5—5 in Fig. 4.
Figure 6:
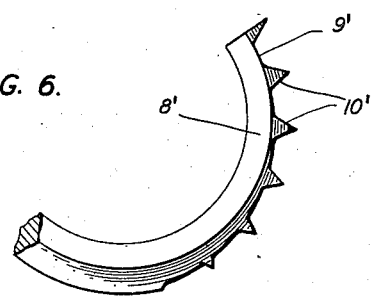
Fig. 6 is a rear view of a modified coil end.

Referring now to the drawing, the coil in general denoted by 1, is wound cylindrically in such a manner that its convolutions fit with their outer portions 2 into the tapped threading of a boss member 4 (Figs. 4 and 5) for which it is destined, and that the inner portions 3 of the convolutions constitute a threading into which an externally threaded member (not shown) may be screwed. According to the threading of the boss member, which is shown as of standard type, the coil wire cross-section is of diamond shape. However, it is to be understood that the invention is not limited to any particular cross-section. The cross-section of the wire will be selected in each individual case according to circumstances so as to fit the threading of the boss member and the stud for which the coil is destined. The invention is equally well applicable to other cross-sections of the wire which may be, e. g. circular, pear-shaped, or even of asymmetrical configuration. The front end of the coil is bent to form a diametrical tang 5, and a notch 6 is provided on the inside of the coil close to the bend 7. The tang is provided as a means which may be gripped by a tool in order to insert the coil in the boss member 4, and notch 6 serves to facilitate breaking of the tang after the coil has been inserted. It is to be understood, however, that in connection with the present invention, the tang is mentioned and shown merely as an example, and that my invention is equally well applicable to an insert coil the front end of which is differently shaped to facilitate insertion or which does not embody any special means for engagement by a tool. The rear end portion 8, over a suitable length, is recessed in a plurality of places from the outside to approximately half the thickness of the wire. The recesses 9 are of such a shape that sharp-edged teeth 10 are formed which are preferably at such a distance from each other that the bottom 11 of each recess is wider than the root 12 of a tooth 10. This is done in order to provide sufficient space for the material which will be displaced and compressed by and between the teeth when the latter are forced radially outward into the root and flanks of the thread groove in the boss member. A coil of the type described may be screwed into the tapped threading 20 of the boss member 4, so that the tang-provided portion is the leading end and the teethed portion is the trailing end. The coil used for this purpose should be somewhat shorter than the tapped threading and should be so inserted that at least a portion of the end convolution of the threading adjacent the trailing coil end is free from the coil. Then, by applying radial force from the interior to the coil portion 8, the latter may be pressed with its teeth 10 into the material surrounding that portion of the thread groove 20 of the boss in which the coil end 8 is located, as clearly shown at 21 in Figs. 4 and 5. In the finished assembly, therefore, the coil end 8 is widened as stated hereinbefore at 22, thereby facilitating the insertion of a bolt or stud member in the coil. In addition to the radial pressure, axial pressure may also be exerted on the surface of the boss surrounding the tapped hole so as to compress still further the material between the teeth of the coil. Owing to the fact that the coil portion 13 adjacent the end portion 8 will not be embedded deeper than the tapped groove 20, the widening of the portion 8 will be more or less gradual so that the depth to which the teeth 10 penetrate into the boss material will increase from the portion 13 to the end of the coil. In view of this fact, the teeth need not be of equal height, and accordingly Fig. 6 illustrates a modified trailing end portion 8' wherein the heights of the teeth 10' and the depths of the recesses 9' gradually decrease from the end to the body of the coil.

Figure 2:
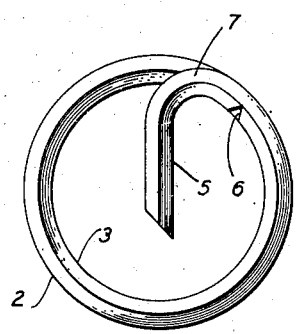
Figs. 2 and 3 are front and rear views of the coil.
Figure 1:
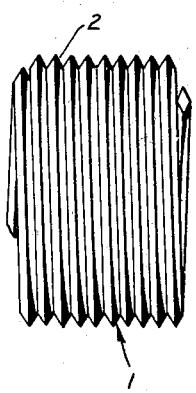
Figure 3:
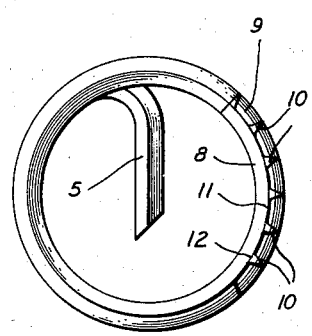
Figure 7:
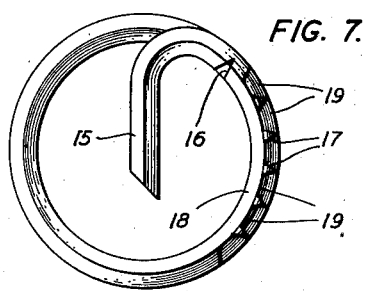
Fig. 7 is a front view of another modification.

In certain instances, it may be required that not only the end of the coil, which hereinbefore was denoted as the trailing end, is secured in the tapped hole against relative movement, but that also the leading end can be anchored in a similar manner after the coil has been positioned in the boss member. Fig. 7 shows such a coil end similar to that of Fig. 2, i. e. provided with a tang 15 and a notch 16 of a kind described in connection with the parts 5 and 6. In order to shape the anchoring teeth 17, the portion 18 of the coil subsequent to the notch 16 is recessed at 19 in the same manner as the aforementioned portion 8. With respect to the notch 16, it is to be considered, that the recesses between the teeth 17 also cause a weakening of the wire so that there may be the danger that in removing the tang 15 by bending it to and fro, the break may occur in a recess rather than in the notch. For this reason the notch 16 may be made deeper than the recesses, that means, more than half of the wire thickness in which event the break will be insured to take place at the location of the notch. Notch 16 may be omitted if the first recess 19 located between the first tooth and the tang is made deeper and more in the form of a notch than the remainder of the recesses. Even if a relatively very deep notch or recess is provided, there is in general no danger of the tank breaking off during the insertion of the coil because only a small force will be required in order to contract the coil sufficiently to screw it into the threading of the boss or nut. When the coil of the type of Fig. 7 is inserted in the tapped hole, the tang may be removed and then the remaining coil end anchored into the boss material by radial pressure in the same manner as the trailing coil end and as described with respect to Figs. 4 and 5.

In a similar manner coil ends having a shape different from those illustrated and described may be provided with recesses and teeth for the purpose of securing the coil against undesired backing and/or advancing from its position in the tapped groove of a boss or nut member.

It will be apparent to those skilled in the art that many alterations and modifications of the mechanism illustrated and described are possible without departing from the spirit and essence of my invention which for this reason shall be limited only by the scope of the appended claims.

I claim:

1. The combination of a boss or nut member provided with an interior screw threading, and a wire coil insert of a length shorter than said threading and screwed entirely into the threading of said member so that at least a portion of the end convolution of said threading is free from said coil, the end portion of said coil adjacent said end convolution of said threading being provided at its outer periphery with a plurality of teeth-forming recesses and being pressed in radial direction with said teeth into the thread groove portion in which it is embedded so that the radii of its inner periphery are longer than those of the inner periphery of the remainder of the coil.

2. The combination of a boss member with an interior screw threading and a wire coil insert of a length shorter than said threading and screwed entirely into the threading of said member so that at least a portion of the end convolution of said threading is free from said coil, the end portion of said coil adjacent said end convolution of said threading being provided at its outer periphery with a plurality of teeth-forming recesses and being pressed in radial direction with said teeth into the thread groove portion in which it is embedded so that the radii of its inner periphery are longer than those of the inner periphery of the remainder of the coil, and the material of the boss member between said teeth and in their neighborhood being compressed in axial direction after the insertion of the coil.

3. A wire coil insert for a screw threading, having a portion of an end convolution provided at its outer periphery with a plurality of recesses forming teeth of substantially triangular shape with a corner of the triangle located on the outer periphery of said end convolution, the first one of said recesses extending from the ultimate end of said convolution towards the other end of the insert, whereby said teeth are adapted upon radial pressure being exerted on said convolution to enter readily with said corners into the material of a thread groove for which said insert is destined.

4. An insert as claimed in claim 3 wherein said recesses are of a maximum depth substantially equal to the depth of a thread groove for which said insert is destined.

5. An insert as claimed in claim 3 wherein the heights of the teeth and the depths of the recesses gradually decrease from the coil end towards the coil body.

6. A wire coil insert for a screw threading including a tang at one of its ends, a portion of the coil convolution adjacent said tang being provided at its outer periphery with a plurality of teeth-forming recesses and at its inner periphery with a notch which is deeper than said recesses and located intermediate the outer recesses and the bend of the tang.

HARKNESS W. CRAM.